(12) United States Patent
Drummond (10) Patent No.: US 11,246,452 B2
(45) Date of Patent: Feb. 15, 2022

(54) APPLIANCE BASE

(71) Applicant: Donald Charles Drummond, Kelowna (CA)

(72) Inventor: Donald Charles Drummond, Kelowna (CA)

(73) Assignee: DC Drummond Products Inc., Kelowna (CA)

( * ) Notice: Subject to any disclaimer, the term of this patent is extended or adjusted under 35 U.S.C. 154(b) by 0 days.

(21) Appl. No.: 16/852,219

(22) Filed: Apr. 17, 2020

(65) Prior Publication Data

US 2021/0324993 A1    Oct. 21, 2021

(51) Int. Cl.
*A47J 43/07* (2006.01)
*F16M 5/00* (2006.01)

(52) U.S. Cl.
CPC .............. *A47J 43/07* (2013.01); *F16M 5/00* (2013.01); *F16M 2200/08* (2013.01)

(58) Field of Classification Search
CPC ....... F16M 2200/08; A47J 47/16; A47J 47/19; A47J 43/0705
See application file for complete search history.

(56) References Cited

U.S. PATENT DOCUMENTS

| | | | | |
|---|---|---|---|---|
| 194,371 A * | 8/1877 | Raymond | ............. | D06F 79/023 38/142 |
| 2,838,647 A * | 6/1958 | Gorlinski | ............... | B44D 3/168 219/245 |
| 3,301,103 A * | 1/1967 | James | ....................... | B67B 7/14 81/3.32 |
| 3,362,666 A * | 1/1968 | James | ...................... | B41J 29/08 248/633 |
| 3,883,923 A * | 5/1975 | England | ................. | A47B 91/06 16/42 R |
| D246,497 S * | 11/1977 | Toyosawa | ....................... | D32/73 |
| D336,700 S * | 6/1993 | Riemann | ....................... | D32/71 |
| D366,545 S * | 1/1996 | Sambamurti | .................. | D32/73 |
| 5,526,596 A | 6/1996 | Bitzel et al. | | |
| 5,692,830 A * | 12/1997 | Costanzo | ................ | A47J 43/00 366/199 |
| 5,893,640 A | 4/1999 | Myers et al. | | |
| 5,937,552 A * | 8/1999 | Hall | ........................ | D06F 75/38 38/93 |
| 6,206,424 B1 * | 3/2001 | Edwards | ................. | B62B 15/00 16/42 R |

(Continued)

FOREIGN PATENT DOCUMENTS

| | | |
|---|---|---|
| DE | 2011000631 | 8/2012 |
| EP | 2347687 | 7/2011 |

(Continued)

*Primary Examiner* — Eret C McNichols
(74) *Attorney, Agent, or Firm* — Richard D. Okimaw (57) ABSTRACT

An apparatus for supporting an appliance having a base extending between front and rear edges comprises a planar base member extending between a front and rear edge and having top and bottom surfaces, a front wall extending from the top surface proximate to the rear edge of the planar base member and a rear wall extending from the top surface proximate to the front edge of the planar base member, rear wall including a rear wall cavity thereinto oriented in a direction towards the front wall.

18 Claims, 6 Drawing Sheets

(56) References Cited

U.S. PATENT DOCUMENTS

| | | | | |
|---|---|---|---|---|
| 6,226,904 | B1 * | 5/2001 | Brady | D06F 79/00 38/95 |
| D463,892 | S * | 10/2002 | Brady | D32/71 |
| 6,464,256 | B1 * | 10/2002 | Edwards | A47B 91/06 16/42 R |
| D467,098 | S * | 12/2002 | Linz | B01F 7/1605 D6/677 |
| D526,845 | S * | 8/2006 | Katz | D7/412 |
| 7,175,338 | B2 * | 2/2007 | Hooper | A47J 43/044 366/197 |
| 7,494,097 | B2 * | 2/2009 | Lidie | B01F 15/00733 248/126 |
| 7,708,242 | B1 * | 5/2010 | Petrashune | B44D 3/14 248/150 |
| 7,806,059 | B2 * | 10/2010 | Bolton | G06F 1/181 108/43 |
| 7,810,777 | B2 | 10/2010 | Paradise et al. | |
| 8,251,340 | B2 | 8/2012 | Webb et al. | |
| 8,321,994 | B2 * | 12/2012 | Edwards | B62B 15/00 16/42 R |
| 8,528,466 | B2 * | 9/2013 | Sweet | A47J 31/58 99/290 |
| 8,635,742 | B2 * | 1/2014 | Smith | B65G 7/02 16/42 R |
| 8,641,005 | B2 | 2/2014 | Cimaglio | |
| 8,641,060 | B2 | 2/2014 | Starr et al. | |
| 9,049,932 | B2 * | 6/2015 | Satur | B32B 7/12 |
| 9,173,524 | B2 | 11/2015 | Wong | |
| 9,192,266 | B2 | 11/2015 | Starr et al. | |
| 9,555,381 | B2 * | 1/2017 | Evans | F16M 11/22 |
| 10,059,361 | B2 * | 8/2018 | Weisbrod | B65D 19/0002 |
| 10,125,916 | B1 * | 11/2018 | Rogers | B65D 1/40 |
| 2001/0046547 | A1 * | 11/2001 | Goldston | F16M 11/42 426/595 |
| 2003/0071152 | A1 * | 4/2003 | Astegno | A47J 43/07 241/101.2 |
| 2005/0011702 | A1 * | 1/2005 | Zeaman | E06C 7/42 182/108 |
| 2005/0263998 | A1 * | 12/2005 | Edwards | B62B 15/008 280/845 |
| 2006/0124808 | A1 * | 6/2006 | Hibbler | B01F 15/00 248/146 |
| 2006/0267467 | A1 * | 11/2006 | Harbison | A47B 51/00 312/331 |
| 2007/0076519 | A1 * | 4/2007 | Kesling | B01F 13/0028 366/129 |
| 2007/0170132 | A1 * | 7/2007 | Bertrand | A47B 77/16 211/70.6 |
| 2008/0136301 | A1 * | 6/2008 | Harbison | A47B 88/981 312/334.1 |
| 2008/0283480 | A1 * | 11/2008 | Segall | A47L 19/02 211/41.6 |
| 2010/0050389 | A1 * | 3/2010 | Robinson | A47B 91/06 16/42 R |
| 2014/0007777 | A1 | 1/2014 | Sweet et al. | |
| 2017/0188704 | A1 * | 7/2017 | Lipper McCauley | A47J 47/16 |
| 2017/0188728 | A1 * | 7/2017 | Votolao | A47G 19/12 |
| 2019/0174965 | A1 | 6/2019 | Greer et al. | |
| 2019/0313855 | A1 * | 10/2019 | Ambrose | B01F 7/1605 |
| 2021/0078240 | A1 * | 3/2021 | Windle | F16M 13/06 |

FOREIGN PATENT DOCUMENTS

| | | |
|---|---|---|
| WO | 2006138335 | 12/2006 |
| WO | 2018107190 | 6/2018 |

\* cited by examiner

APPLIANCE BASE

BACKGROUND

1. Technical Field

This disclosure relates generally to kitchen appliances and in particular, to an apparatus and method for assisting positioning and moving a kitchen appliance on a countertop.

2. Description of Related Art

Kitchen appliances, such as, by way of non-limiting example, mixers, blenders and food processors are common items in many kitchens. Such appliances may however be heavy and inconvenient for some users to move on a regular basis. In particular, appliances made for more regular use or of higher quality may often be heavier in order to ensure reliable operation.

A disadvantage of heavier appliances is the difficulty in moving such appliances between a stored position and an in-use position on a countertop or the like. In addition, such countertop appliances frequently include rubber or other non-slip feet on the bottom thereof. Such feet further make the process of moving the appliance from a cupboard or a rear of a countertop to a desired position more difficult.

SUMMARY OF THE DISCLOSURE

According to a first embodiment, there is disclosed an apparatus for supporting an appliance having a base extending between front and rear edges. The apparatus comprises a planar base member extending between a front and rear edge and having top and bottom surfaces, a front wall extending from the top surface proximate to the rear edge of the planar base member and a rear wall extending from the top surface proximate to the front edge of the planar base member, rear wall including a rear wall cavity thereinto oriented in a direction towards the front wall.

The bottom surface may include a low friction surface. The low friction surface may be selected from the group consisting of felt, fabric and plastic. The top surface may have a profile selected to correspond to a bottom surface of the appliance. The top surface may include recesses and support surfaces between the recesses therein at positions corresponding to feet extending from the bottom surface of the appliance. The recesses may form mounting locations on the bottom surface for adhering low friction pads thereto. The planar base member may have an outline corresponding to the appliance.

The front wall may have an arcuate shape with a concavity towards the rear wall. The front wall may include a handle. The front wall may include first and second portions with the handle therebetween.

The rear wall may have an arcuate shape with a concavity towards the front wall. The front and rear wall may be positioned apart by a distance selected to receive the appliance therebetween. The cavity may have a shape selected to overlie a rear edge of the base of the appliance.

The planar base member and front and rear walls may be formed as a unitary body. The unitary body may be formed by a process selected from the group consisting of casting and molding.

According to a further embodiment, there is disclosed a method of moving an appliance having a base extending between front and rear edges. The method comprises providing a planar base, positioning the rear edge of the appliance in a cavity of a rear wall extending from a top surface of the planar base and positioning the front edge of the appliance behind a front wall extending from the top surface of the planar base.

Other aspects and features of the present disclosure will become apparent to those ordinarily skilled in the art upon review of the following description of specific embodiments in conjunction with the accompanying figures.

BRIEF DESCRIPTION OF THE DRAWINGS

The accompanying drawings constitute part of the disclosure. Each drawing illustrates exemplary aspects wherein similar characters of reference denote corresponding parts in each view.

DETAILED DESCRIPTION

Figure 1:
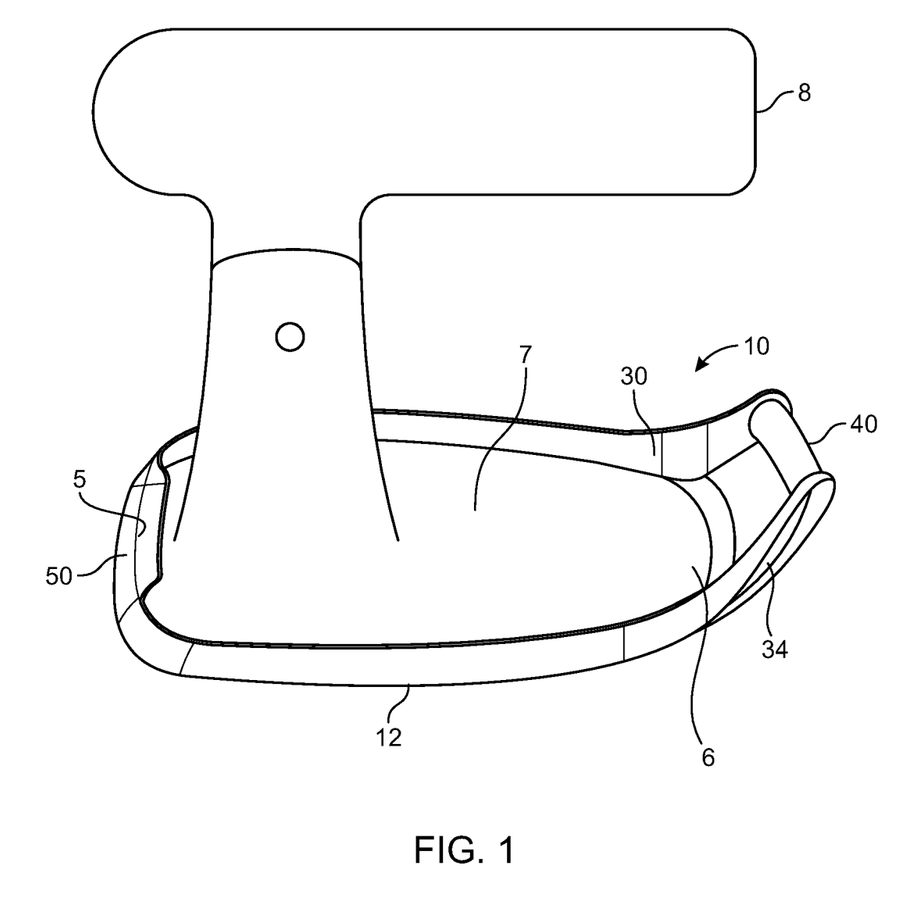
FIG. 1 is a perspective view of a base having an appliance thereon according to a first embodiment.

Aspects of the present disclosure are now described with reference to exemplary apparatuses, methods and systems. Referring to FIG. 1, an exemplary apparatus for supporting an appliance 8 thereon according to a first embodiment is shown generally at 10. The term kitchen appliance or appliance is used generally, however the use of this term is intended to apply to any countertop, kitchen or other appliance which may be utilized on a working surface such as a counter, within a kitchen and is movable by a user between uses. The apparatus 10 comprises a base member 12 with first or front and second or rear walls, 30 and 50, respectively. The front and rear walls 30 and 50 surround and contain a base 7 of the appliance on the apparatus as will be further set out below.

Figure 2:
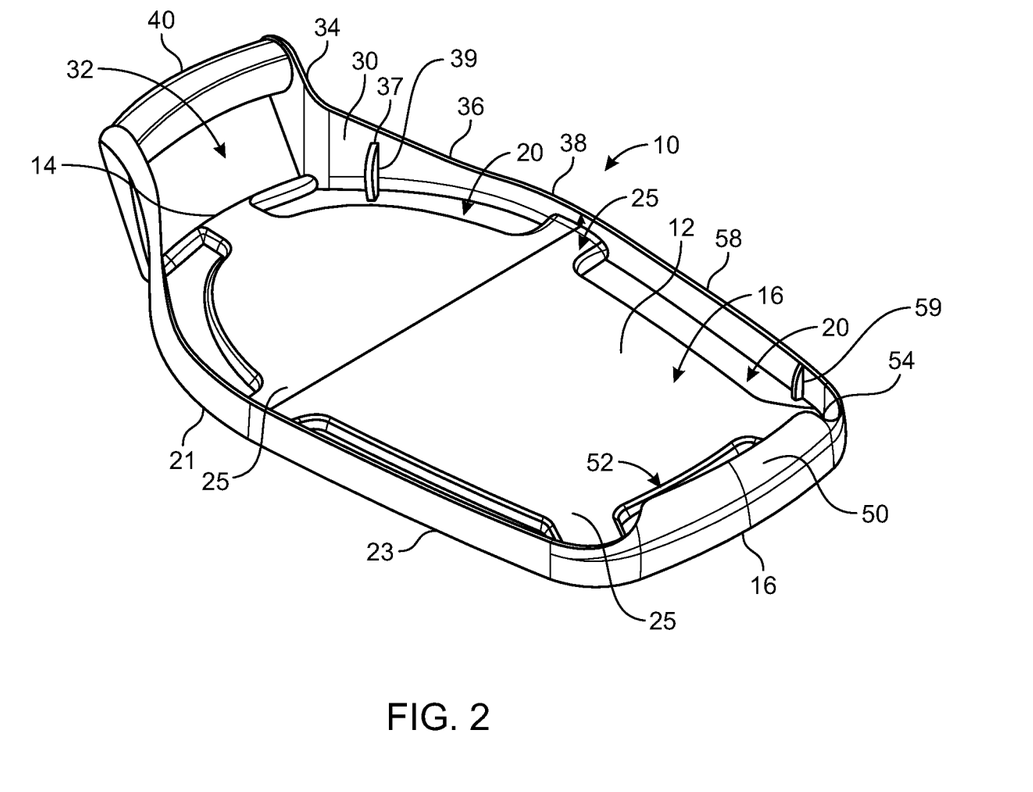
FIG. 2 is a perspective view of the base of FIG. 1.
Figure 3:
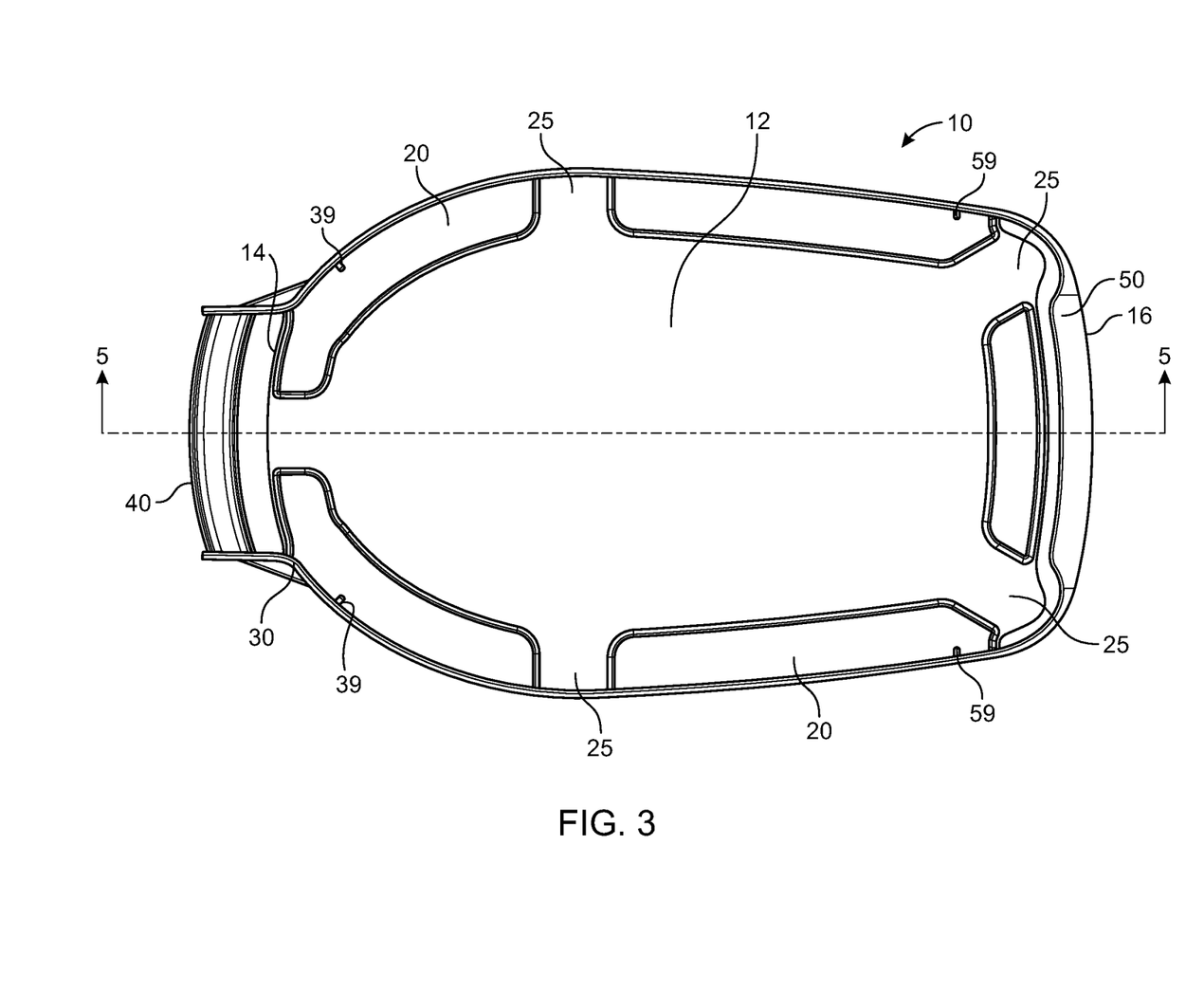
FIG. 3 is a top plan view of the base of FIG. 1.
Figure 4:
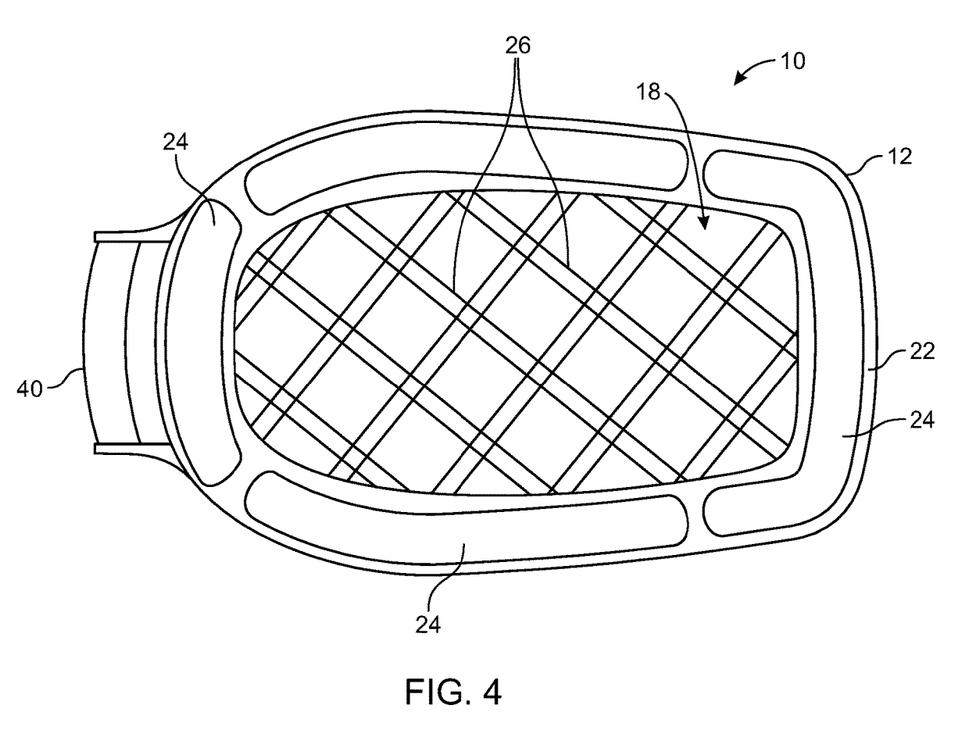
FIG. 4 is a bottom view of the base of FIG. 1.

Referring to FIG. 2, the base 12 comprises a substantially planar member extending between first or front and second or rear edges 14 and 16, receptively. The base 12 has an outer profile (as illustrated in FIG. 3) corresponding substantially to the profile of the base 7 of the make and model of the appliance 8 which the particular apparatus 10 intended to support. It will be appreciated that the outline of the base 12 will be varied for each model which the apparatus 10 is intended to be utilized with. The base 12 includes a top surface 17 and a bottom surface 18 (as illustrated in FIG. 4). The top surface 17 includes a plurality of recesses 20 thereinto. The recesses 20 define inter-recess surfaces 25 as illustrated in FIG. 2 corresponding to locations of feet or other projections from the bottom of the base 7 of the appliance. It will be appreciated that the size and location of the inter-recesses portions 25 and recesses 20 will be selected to correspond to the make and model of the appliance for which the apparatus 10 is intended.

As illustrated in FIG. 4, the bottom surface 18 of the base 12 may include a peripheral portion 22 which is substantially parallel to the top surface 17. The peripheral portion 22 supports a plurality pads 24 thereon formed of felt, fabric or other low friction materials including plastic or the like. As illustrated, the bottom surface 18 may also include a plurality of strengthening ribs 26 as are commonly known to increase the torsional rigidity of the base 12 while keeping weight down. The pads 24 enable the apparatus 10 and appliance 8 to be slidably moved on a surface such as, by way of non-limiting example a countertop. The material for use in the pads 24 may also be selected to provide a degree of friction between the pads and the surface so as to prevent unwanted movement of the apparatus and appliance when the appliance is in use due to vibration or the like.

Figure 6:
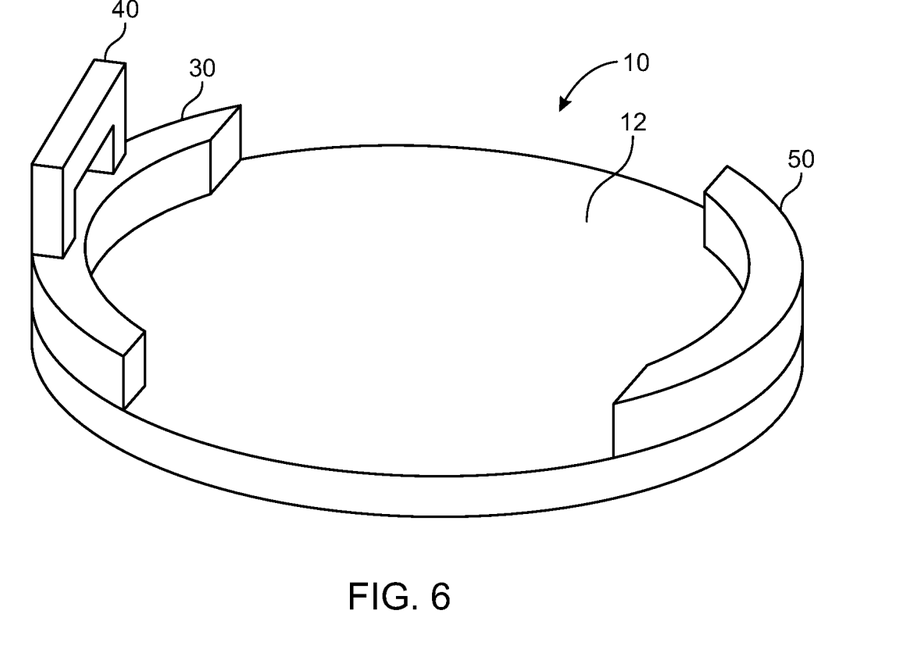
FIG. 6 is a perspective view of the base according to a further embodiment.

As illustrated in FIG. 2, the front wall 30 extends from the base 12 proximate to the front edge 14 thereof. The front wall 30 includes a handle 40 extending therefrom for a user to grasp to manipulate in moving the apparatus 10 and appliance 8. The front wall 30 includes extensions 34 extending substantially upwards therefrom so as to support the handle 40 therebetween. The front wall 30 may comprise a single continuous wall as illustrated in FIG. 6 or may be split into two front walls 30 as illustrated in FIG. 2. In embodiment where the front wall is split into two front walls 30, the two front walls 30 may form a gap 32 therebetween.

Figure 5:
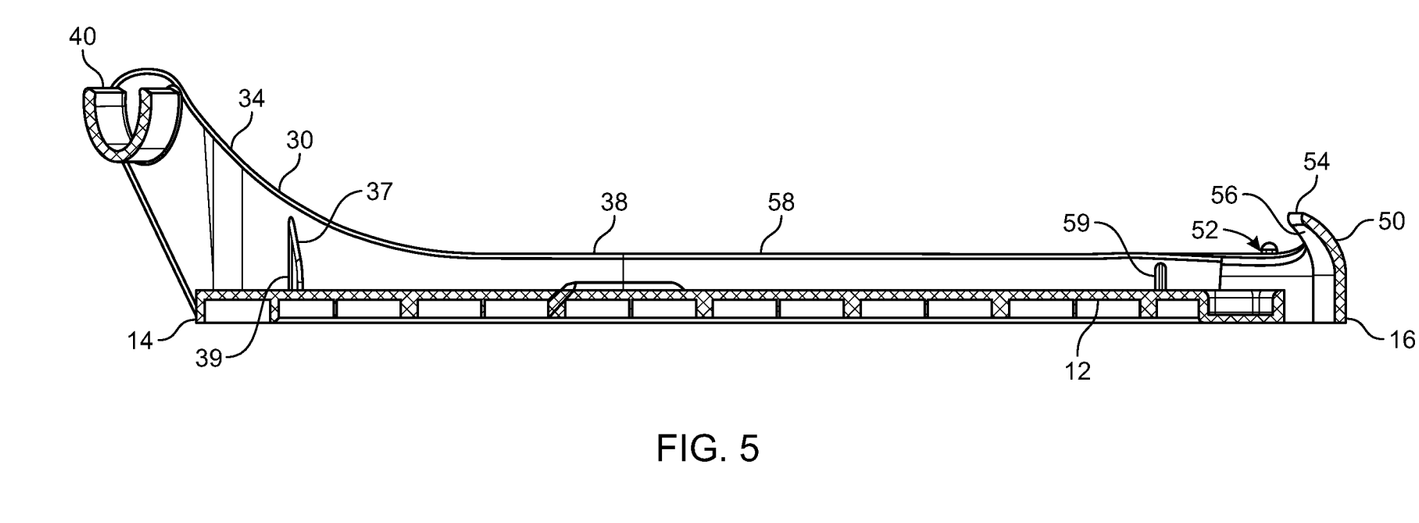
FIG. 5 is a cross sectional view of the base of FIG. 1 as taken along line 5-5 in FIG. 3.

The front wall 30 extends along the peripheral edge of the base 12 so as to conform to an outer edge of the base 7 of the appliance 8. It will be appreciated that the shape of the front wall 30 will therefore be dictated by the appliance with which the particular apparatus 10 is designed. The front wall 30 includes an inner surface 36 which is substantially perpendicular to the base 12 so as to extend vertically therefrom. In operation the vertical inner surface 36 permits the front portion of the appliance to be inserted thereinto in a vertical motion after the rear portion of the appliance is inserted into the rear wall as will be further described below. As further illustrated, the handle 40 is positioned forward of the inner surface 36 of the front wall 30 so as to not interfere with such installation. As illustrated in FIG. 2, the front wall 30 may include front side extensions 38 extending around the side of the base 12 so as to more securely retain the appliance on the base. Optionally, the front side extensions 38 may extend to corresponding rear side extensions 58 extending from the rear wall 50. The front side extensions 38 may include ribs 39 extending therefrom towards each other as illustrated in FIGS. 2, 3 and 5. The front ribs 39 may include an angled surface 37 as illustrated in FIG. 5 which will displace the appliance 8 in a direction into the cavity 52 of the rear wall as the appliance is lowered onto the base. Furthermore, as illustrated in FIGS. 2, 3 and 5, the rear side extensions 58 may include rear ribs 59 extending therefrom towards each other. The rear ribs 59 serve to guide and center the appliance 8 on the base 12.

The rear wall 50 extends from the base 12 proximate to the rear edge 16 thereof. The rear wall 50 forms a cavity 52 therein so as to capture and contain a rear edge 5 of the appliance therein. In particular, the cavity retains the rear edge 5 from being removed without first removing the front edge 6 from the front wall 30 so as to enable the appliance 8 to be moved forward thus removing the rear edge 5 from the cavity. The cavity 52 is formed by a lip portion 54 of the rear wall 50 overlying the base portion and extending towards the front edge 14 of the base 12. As illustrated in FIG. 5, the rear wall 50 includes an inner surface 56 which extends upward from the base and then transitions to be inclined towards the front edge 14 of the base so as to form the lip 54.

In operation, an appliance 8 may be located on the apparatus 10 by first inserting a rear edge 5 of the appliance under the lip 54 and then rotating the front edge 6 down past the front wall 30 until the appliance is resting on the base 12. The handle 40 may then be use to slide the apparatus 10 and appliance 8 around the surface. Additionally, the handle 40 may also be used to lift the appliance 8 and apparatus wherein a user may lift on the handle 40 at the front as well as applying a lifting force to the rear of the appliance. In such a manner, it will be observed that the lip 54 will retain the rear edge 16 of the base 12 and apparatus 10 on the rear edge 5 of the appliance to enable the appliance and apparatus to be lifted together.

As illustrated in FIG. 2, the base 12 may be formed of more than one piece 21 and 23 which are joined together for form the unitary base 12 or may optionally be formed as a single construction as illustrated in FIGS. 3 and 4. The apparatus 10 may be formed by any commonly known construction methods including welding, machining, or moulding. It will be appreciated that the front and rear walls 30 and 50 may also be co-formed with the base 12 or secured thereto after forming.

While specific embodiments have been described and illustrated, such embodiments should be considered illustrative only and not as limiting the disclosure as construed in accordance with the accompanying claims.

What is claimed is:

1. An apparatus for supporting an appliance having a base extending between first and second edges, the apparatus comprising:
 a planar base member extending between a first and second edge and having top and bottom surfaces;
 a first wall extending from the top surface proximate to the first edge of the planar base member; and
 a second wall extending from the top surface proximate to the second edge of the planar base member, second wall includes a first surface oriented towards the first wall, the first surface being concave in both a horizontal and vertical direction so as to form a cavity in the second wall,
 wherein the second wall cavity overlies and retains the apparatus in engagement with the appliance when a second portion of the appliance is lifted, and
 wherein the first wall includes a handle member extending parallel to and spaced above the base member operable to be grasped and lifted by a user when the appliance is located on the base member so as to enable the appliance and apparatus to be lifted by the handle and a second portion of the appliance.

2. The apparatus of claim 1 wherein the bottom surface includes a layer of a low friction material applied thereunder.

3. The apparatus of claim 2 wherein the low friction surface is selected from the group consisting of felt, fabric and plastic.

4. The apparatus of claim 1 wherein the top surface has a profile selected to correspond to a bottom surface of the appliance.

5. The apparatus of claim 4 wherein the top surface includes recesses therein and support surfaces between the recesses at positions corresponding to feet extending from the bottom surface of the appliance.

6. The apparatus of claim 5 wherein the recesses form mounting locations on the bottom surface for adhering low friction pads thereto.

7. The apparatus of claim 1 wherein the planar base member has an outline corresponding to the appliance.

8. The apparatus of claim 1 wherein the first wall has an arcuate shape with a concavity towards the second wall.

9. The apparatus of claim 1 wherein the first wall includes first and second portions with the handle therebetween.

10. The apparatus of claim 1 wherein the second wall has an arcuate shape with a concavity towards the first wall.

11. The apparatus of claim 1 wherein the first and second wall are positioned apart by a distance selected to receive the appliance therebetween.

12. The apparatus of claim 1 wherein the cavity has a shape selected to overly a second edge of the base of the appliance.

13. The apparatus of claim 1 wherein the planar base member and first and second walls are formed as a unitary body.

14. The apparatus of claim 13 wherein the unitary body is formed by a process selected from the group consisting of casting or molding.

15. The apparatus of claim 1 wherein the distance between the first wall and a deepest part of the cavity in the second wall is selected to correspond to the length of the baes of the appliance.

16. The apparatus of claim 1 wherein the handle extends between a pair of upright portions extending from the first wall.

17. The apparatus of claim 16 wherein the handle is spaced forward of the first edge of the base member.

18. A method of moving an appliance having a base extending between first and second edges, the method comprising:
providing a planar base;
positioning the second edge of the appliance in a cavity of a second wall extending from a top surface of the planar base, the cavity defined by a first surface of the second wall oriented towards the first wall wherein the first surface is concave about a horizontal and a vertical direction, so as to retain a portion of the appliance base under the cavity;
positioning the first edge of the appliance behind a first wall extending from the top surface of the planar base,
lifting upwardly on a handle extending parallel to and spaced above the base member supported by the first wall and a second portion of the appliance so as to lift the appliance and base together.

* * * * *